J. CUMMINGS.
Thrashing Machine.
No. 1,891. Patented Dec. 10, 1840.
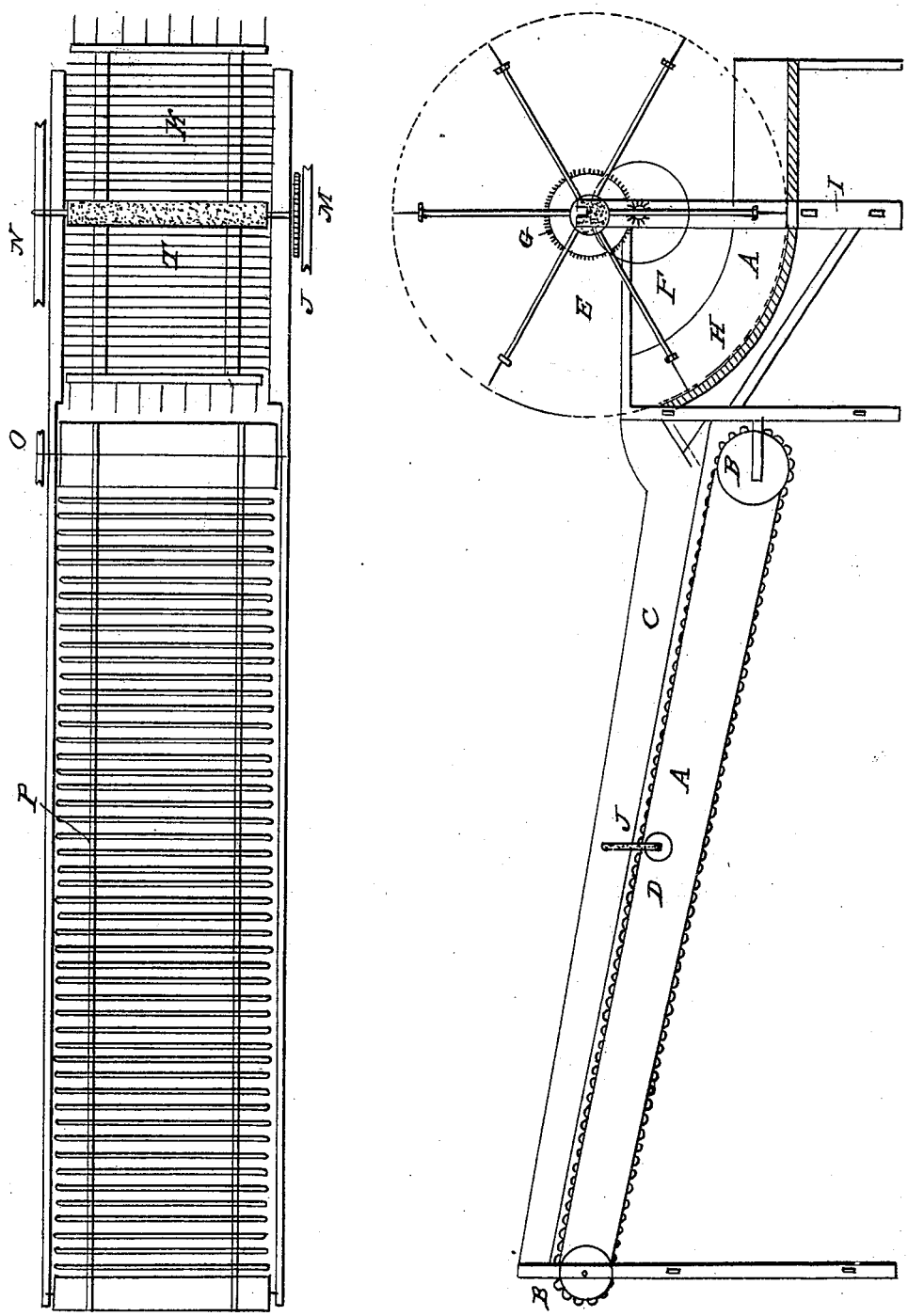
Witnesses
Inventor
James Cummings

UNITED STATES PATENT OFFICE.

JAMES CUMMINGS, OF CECIL, PENNSYLVANIA.

THRESHING-MACHINE.

Specification of Letters Patent No. 1,891, dated December 10, 1840.

*To all whom it may concern:*

Be it known that I, JAMES CUMMINGS, of Cecil, in the county of Washington and State of Pennsylvania, have invented a new and useful Improvement on Machines to Separate Straw from Grain and Carry Away the Straw from the Machine.

The nature of my invention consists in receiving the straw and grain from the threshing machine and separating them, carrying the straw straight forward or to the left hand or right hand as they see proper and at the same time discharging the grain below itself or under the threshing machine.
To enable others skilled in the art to make and use my invention I will proceed to describe its construction and operation. I construct a frame two feet six inches square or as the case may require. On the side of the frame next the thresher I place my rake wheel and concave rack under it to discharge the grain. Through said rack it may be readily conveyed to an understory and into a wind mill which may be put in operation by a pulley on the end of the rake wheel shaft and the grain thoroughly cleaned. The rake wheel shaft I dress it six sides five inches thick two set of mortises in it five inches from the ends to receive the rims. To carry the rakes the arms are four feet two inches long; two inches and one half by one inch thick; the rakes I make one inch and a half by one inch thick two feet long as the case may require I fasten them with screw bolts to the arms, the rake teeth five inches long made of wood or iron. The diameter of the rake wheel is five feet. The rack I make straight from the thresher to the frame of the rake wheel, then continue the circle of the rakes till it rises one foot six inches. I make pieces of wood two feet long or as the case may require one inch by half inch thick; I place them on edge transversely three fourths of an inch asunder on the rack. For the straw bearer I fix two screws in the back of the first frame two feet high on which I place a cylinder one foot diameter with cogs in it three fourths of an inch asunder to carry the endless rope on which I place rods half inch diameter fastened with rivets, each of them passing between the cogs to keep the one end of them from going before the other. Ten feet from the back of the first frame or as the case may require I place a frame made of two pieces of wood five feet long four inches by one inch thick with two cross bars framed one foot from each end of it. On this frame I place a cylinder six inches diameter to carry the endless rope from the first cylinder. Between the first and second frame I fit two boards six inches by one inch; which I call fenders to keep the straw on the rods and on said fenders. On the lower edge I place two iron hooks to carry a small roller to support the endless rope in the middle.

To give motion to this machine I place a pulley three inches on the thresher shaft of the threshing machine and on the side of the frame of the rake wheel I place a pulley one foot two inches diameter with a pinion of ten cogs on same shaft to work in a wheel of sixty cogs on the shaft of the rake wheel. On the other end of said shaft I place a pulley two feet six inches to give motion to the first cylinder of the straw bearer on which is a pulley of six inches with a bevel cast iron wheel of six inches to give motion to the straw bearer to the right hand or left by placing an iron shaft in the place of the first cylinder with a pulley and bevel wheel of six inches on the end and a pulley on the other by turning said shaft end for end it will drive the bearer as wanted.

What I claim as my invention is—

The mode herein described of conveying the straw from the thresher by means of a wheel of rakes placed over a concave rack, and raking the straw over it at the same time permitting the grain to pass through interstices of the rack, the whole being arranged constructed and operating as herein set forth.

JAMES CUMMINGS.

Witnesses:
 JAMES MCCLELLAND,
 G. A. KIRK.